(12) United States Patent
Kassner

(10) Patent No.: US 7,040,304 B2  
(45) Date of Patent: May 9, 2006

(54) METHOD FOR OPERATING AN INTERNAL COMBUSTION ENGINE

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/776,049

(22) Filed: Feb. 10, 2004

(65) Prior Publication Data

US 2004/0221837 A1   Nov. 11, 2004

(30) Foreign Application Priority Data

Feb. 18, 2003   (DE)   ............... 103 06 632

(51) Int. Cl.
*F02B 53/00*   (2006.01)
*F02N 17/00*   (2006.01)

(52) U.S. Cl. .................. 123/565; 123/179.18

(58) Field of Classification Search ............ 123/179.4, 123/179.3, 179.18, 565; 701/112
See application file for complete search history.

(56) References Cited

U.S. PATENT DOCUMENTS

| | | | | |
|---|---|---|---|---|
| 2,824,552 A | * | 2/1958 | Scheiterlein | ............. 123/41.46 |
| 4,009,695 A | * | 3/1977 | Ule | ............. 123/179.5 |
| 4,232,521 A | * | 11/1980 | Gali Mallofre | ............. 60/612 |
| 4,462,348 A | * | 7/1984 | Giardini | ............. 123/179.1 |
| 5,687,682 A | * | 11/1997 | Rembold et al. | ............. 123/179.3 |
| 5,704,323 A | * | 1/1998 | Gardell et al. | ............. 123/179.3 |
| 6,098,585 A | * | 8/2000 | Brehob et al. | ............. 123/179.5 |
| 6,125,808 A | * | 10/2000 | Timewell | ............. 123/179.5 |
| 6,218,799 B1 | * | 4/2001 | Hori | ............. 318/446 |
| 6,453,864 B1 | * | 9/2002 | Downs et al. | ............. 123/179.3 |
| 6,647,955 B1 | * | 11/2003 | Sieber | ............. 123/322 |
| 6,681,173 B1 | * | 1/2004 | Turner et al. | ............. 701/113 |
| 6,688,104 B1 | * | 2/2004 | Baeuerle et al. | ............. 60/608 |
| 6,772,723 B1 | * | 8/2004 | Aoki et al. | ............. 123/179.4 |
| 2005/0000217 A1 | * | 1/2005 | Nau et al. | ............. 60/612 |

* cited by examiner

*Primary Examiner*—Henry C. Yuen
*Assistant Examiner*—Arnold Castro
(74) *Attorney, Agent, or Firm*—Kenyon & Kenyon LLP

(57) ABSTRACT

A method for operating an internal combustion engine, simplifying a direct start after an engine shutdown. A compressor is provided for compressing the fresh air supplied to an internal combustion engine of the internal combustion engine. The compressor is activated to fill at least one cylinder when the combustion engine is coasting, this cylinder coming to a standstill in a position suitable for a subsequent direct start.

9 Claims, 2 Drawing Sheets

METHOD FOR OPERATING AN INTERNAL COMBUSTION ENGINE

BACKGROUND INFORMATION

Methods are already known for operating an internal combustion engine in which fresh air is compressed and sent to an combustion engine of the internal combustion engine via a compressor.

Direct start is a special mode of operation for direct-injection internal combustion engines using the Otto method. Direct start is a start without using an auxiliary drive by injecting fuel into a cylinder whose intake and exhaust valves are closed and then igniting it by an ignition spark. The torque thus generated induces a movement of the crankshaft of the internal combustion engine, permitting combustion in other cylinders and thus ramping up the combustion engine. Rapid and quiet starting is advantageous for start-and-stop operation in particular, i.e., automated shutoff of the engine at red lights and the like. It is customary for the stationary vehicle to be recognized by a logic unit which shuts down the engine with the help of the existing controller when other conditions prevail, e.g., when disengaging the clutch, or when in neutral position in the case of an automatic transmission, and which automatically restarts the combustion engine with certain driver responses such as engaging the clutch.

SUMMARY OF THE INVENTION

The method according to the present invention has the advantage over the related art that when the combustion engine is coasting, the compressor is activated to fill at least one cylinder, which then comes to a standstill in a position suitable for a subsequent direct start. This makes it possible to ensure that the at least one cylinder will be filled with enough fresh air for the following direct start. This increases the reliability of the direct start.

It is particularly advantageous if the compressor is driven independently of the internal combustion engine. This ensures that compression of the fresh air supplied, which is required for adequate filling of the at least one cylinder, may still be achieved when the combustion engine is coasting, at which time a compressor such as an exhaust gas turbocharger that is driven as a function of the internal combustion engine is no longer delivering the required compressor output.

Another advantage is obtained when an electrically operated supercharger is used as the compressor. This yields a compressor that is driven independently of the internal combustion engine in a particularly simple manner.

It is particularly advantageous if the compressor is activated as a function of the engine speed of the internal combustion engine. This makes it possible to detect coasting of the combustion engine while also permitting a prediction to be made of how many revolutions the combustion engine will execute until it comes to a standstill. Activation of the compressor may thus be delayed as long as possible and energy savings are also possible.

An advantage is also obtained when the compressor is activated as a function of a crank angle of the internal combustion engine so that fresh air may be supplied to the at least one cylinder at least during the last opening of the intake valve of the at least one cylinder before the engine comes to a standstill. This permits even more precise adjustment of the use of the compressor, so that activation of the compressor may be limited to the minimum amount of time required. This results in additional energy savings.

It is also advantageous if the compressor remains activated at least until the last closing of the intake valve and the exhaust valve of the at least one cylinder before the engine comes to a standstill. This ensures that the fresh air filling in the at least one cylinder will be maintained for a subsequent direct start.

It is particularly advantageous if the compressor is activated as a function of a crank angle of the internal combustion engine so that fresh air may be added to the at least one cylinder at least during a last overlap of the opening of the intake valve and the exhaust valve of the at least one cylinder before the engine comes to a standstill. It is thus possible to not only ensure filling of the at least one cylinder with fresh air for the subsequent direct start but also to prevent a backflow of residual gas from an exhaust line of the internal combustion engine into the combustion chamber of the at least one cylinder. This improves the ignition and combustion properties of the air/fuel mixture present in the combustion chamber of the at least one cylinder for a subsequent direct start.

It is also advantageous if the compressor is triggered so that the combustion chamber of the at least one cylinder is filled with fresh air to the maximum extent after the last closing of the intake valve and the exhaust valve before the engine comes to a standstill. This optimizes the ignition and combustion properties of the air/fuel mixture present in the combustion chamber of the at least one cylinder for a subsequent direct start.

Another advantage is obtained when the compressor is triggered so that a backflow of residual gas from an exhaust line of the internal combustion engine into the combustion chamber of the at least one cylinder is largely prevented. This also optimizes the ignition and combustion properties of the air/fuel mixture present in the combustion chamber of the at least one cylinder for a subsequent direct start.

DETAILED DESCRIPTION

Figure 1:
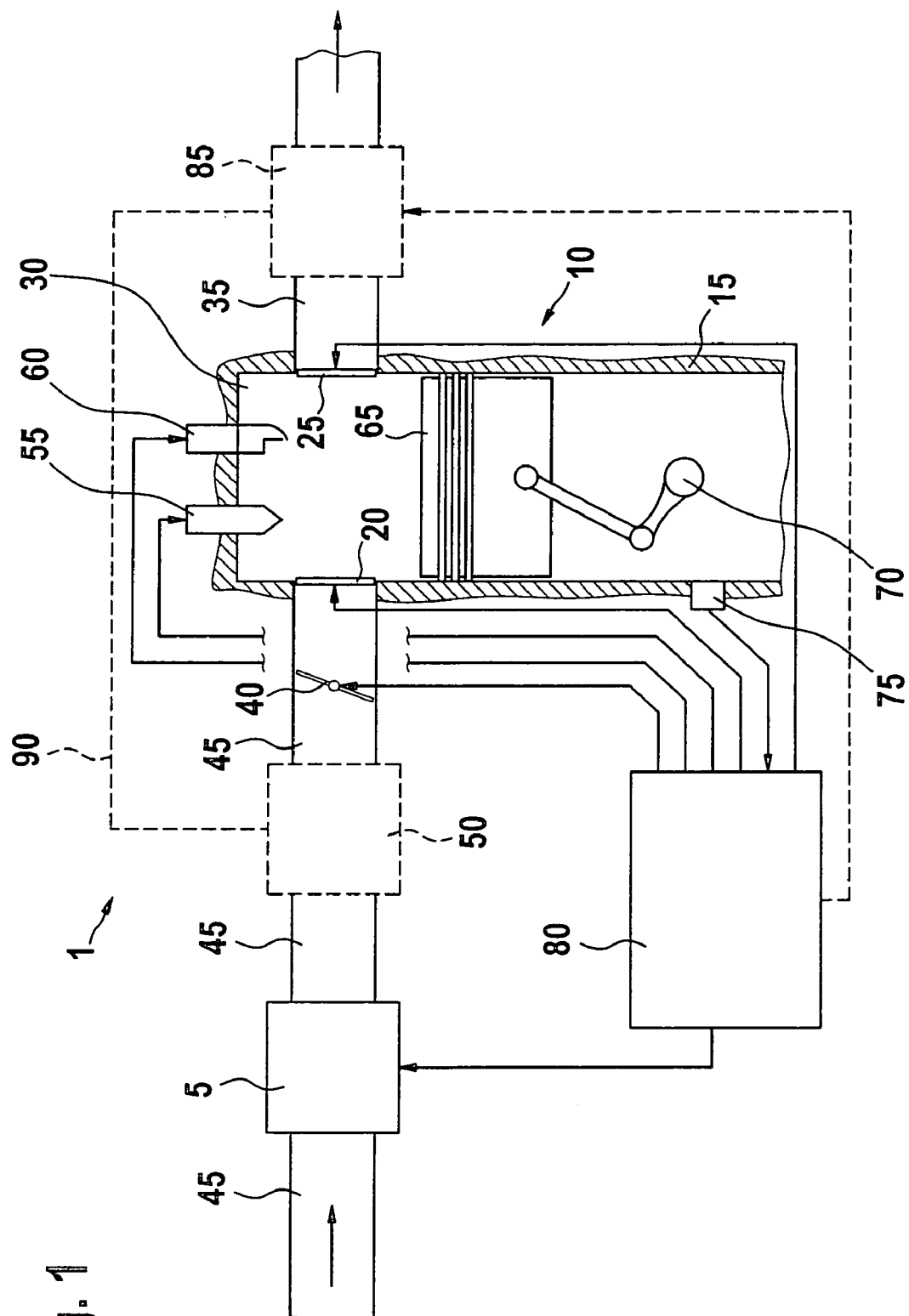
FIG. 1 shows a block diagram of an internal combustion engine.

FIG. 1 shows an internal combustion engine 1 of a motor vehicle, for example. Internal combustion engine 1 includes a combustion engine 10, which may be designed as an Otto engine or as a diesel engine, for example. It shall be assumed below as an example that combustion engine 10 is an Otto engine. Fresh air is supplied to Otto engine 10 through an air supply 45. A first compressor 5 is provided in air supply 45 and is driven independently of internal combustion engine 1. First compressor 5 may be driven electrically, for example, using an electric motor. It shall be assumed below as an example that first compressor 5 is driven electrically. As shown with broken lines in FIG. 1, a second compressor 50 may optionally also be situated downstream from first compressor 5 in air supply 45 in the direction of flow of the fresh air, which is indicated with an arrow in FIG. 1. Second compressor 50 may be driven as a function of internal combustion engine 1. In the present example, second compressor 50 is driven by a turbine 85 in an exhaust line 35 via a shaft 90 and therefore forms an exhaust turbocharger together with turbine 85 and shaft 90. Turbine 85 and shaft 90 are also optionally provided and are shown with broken lines in FIG. 1.

A throttle valve 40 for adjusting the mass air flow rate is situated in air supply 45 downstream from second compressor 50 in the direction of flow of the fresh air. Fresh air is supplied to a combustion chamber 30 of at least one cylinder 15 of combustion engine 10 through an intake valve 20. Fuel may be supplied to combustion chamber 30 through a fuel injector 55. The air/fuel mixture reaching combustion chamber 30 in this way is ignited by a spark plug 60. A piston 65 of the at least one cylinder 15 is driven in this way and in turn drives a crankshaft 70 of internal combustion engine 1 in a manner with which those skilled in the art are familiar. A crank angle sensor 75 is provided in the area of combustion engine 10, detecting the instantaneous crank angle and relaying this information to a controller 80, e.g., an engine controller, for further analysis. The exhaust gas formed by combustion of the air/fuel mixture in combustion chamber 30 is ejected through an exhaust valve 25 into exhaust line 35. The direction of flow of the exhaust gas is also marked by an arrow in FIG. 1.

Engine controller 80 controls the degree of opening of throttle valve 40 to adjust a desired mass air flow rate in air supply 45. Furthermore, engine controller 80 triggers fuel injector 55 to adjust a fuel mass to be injected, e.g., to achieve a preselected lambda value. Furthermore, engine controller 80 triggers spark plug 60 to set a preselected ignition time. In addition, engine controller 80 triggers intake valve 20 and exhaust valve 25 for setting preselected opening times and closing times as part of a fully variable valve control. Alternatively, the opening and closing of intake valve 20 and exhaust valve 25 may each be accomplished by a camshaft which cooperates with the crankshaft in a manner with which those skilled in the art are familiar. Engine controller 80 also triggers the electric motor (not shown in FIG. 1) of first compressor 5 to set a desired compressor output. Furthermore, in this example, engine controller 80 optionally triggers a waste gate of turbine 85 to regulate the compressor output of the exhaust turbocharger.

The adjustment of the air flow rate, the quantity of fuel to be injected, and the ignition time help to implement a driver's desired torque as preselected via a gas pedal by a driver of the vehicle, for example. This torque may be further increased by compression by first compressor 5 and/or second compressor 50.

In the case of a diesel engine, throttle valve 40 and spark plug 60 are not provided. Furthermore, internal combustion engine 10 may include one or more cylinders.

Successful direct start requires a suitable shutdown of combustion engine 10. Shutdown includes the creation of a crankshaft position suitable for a direct start. A suitable crankshaft position is when the at least one cylinder of combustion engine 10 comes to a standstill in a preferred position for a reliable direct start. Such a preferred position occurs when a cylinder in a working phase comes to a standstill approximately at a first preselected crank angle after top dead center. The cylinder may be used in this way for a direct start by injection with the combustion engine stopped and with the ignition stopped after successful formation of a fuel/air mixture in the working phase at a suitable first preselected crank angle after top dead center. The engine is then ramped up without operation of a starter. The preferred position may be achieved through suitable intervention measures by engine controller 80 in a manner with which those skilled in the art are familiar.

Supercharging is a known measure for increasing engine performance. A known method is to use an exhaust turbocharger as depicted in FIG. 1. The main disadvantage here is the required minimum rotational speed of combustion engine 10 which supplies the exhaust mass flow required for charging by the exhaust turbocharger. The required supercharging may be implemented by first compressor 5, in this example the electrically operated supercharger, even for the operating range of internal combustion engine 1 in which the exhaust turbocharger may not be operated, i.e., below the minimum rotational speed. It is possible in this way for it to spontaneously achieve supercharging by first compressor 5 regardless of engine speed and thus the operating state of internal combustion engine 1 and therefore the turbohole problem, as it is called, is prevented. In normal driving, first compressor 5 is activated when the driver requires a high torque of combustion engine 10 and the exhaust turbocharger is unable to achieve a significant charging effect.

According to the present invention, first compressor 5 is also activated when combustion engine 10 is coasting to permit a subsequent direct start. While engine 10 is coasting, first compressor 5 is activated to fill the at least one cylinder 15, which comes to a standstill in a position suitable for the subsequent direct start, i.e., the preferred position described above. This makes it possible to ensure that the at least one cylinder 15 is filled with enough fresh air for the subsequent direct start to permit a successful direct start. First compressor 5 may be activated as a function of engine speed. Engine speed may be determined in engine controller 80 from the crank angle signal supplied by crank angle sensor 75 by derivation over time. On the basis of the engine speed, engine controller 80 is able to determine whether combustion engine 10 is coasting. To do so, engine controller 80 may, for example, check on whether the engine speed has fallen below a preselected threshold. The preselected threshold may be selected so that it is between an idling speed and zero. The preselected threshold is advantageously considerably below the idling speed to prevent erroneous detection of coasting of combustion engine 10. Thus if the engine speed falls below the preselected threshold, it may be assumed with great reliability that combustion engine 10 is coasting. Engine controller 80 may also determine the gradient of the engine speed over time and may determine from that how many revolutions the crankshaft will still execute before the engine comes to a standstill.

To fill the at least one cylinder 15 for the subsequent direct start, it is sufficient if first compressor 5 is activated for the last opening of intake valve 20 before the engine comes to a standstill. This makes it possible to save energy for operation of first compressor 5. If first compressor 5 is electrically driven, as in the present example, and the internal combustion engine drives a motor vehicle, then this makes it possible to minimize the load on the vehicle electrical system. First compressor 5 may thus be activated as a function of the engine speed of internal combustion engine 1 so that its compressor output is increased at the latest with the last revolution of the crankshaft.

Even more precise triggering of first compressor 5 is possible if first compressor 5 is also activated as a function of a crank angle of internal combustion engine 1 so that fresh air may be added to the at least one cylinder 15, which is to be brought to the preferred position described above for the subsequent direct start, at least during the last opening of intake valve 20 of the at least one cylinder 15 before the engine comes to a standstill. This is sufficient to prepare the at least one cylinder 15 for the subsequent direct start. First compressor 5 may also be activated before the last opening of intake valve 20 of the at least one cylinder 15 so that the at least one cylinder 15, i.e., its combustion chamber 30, is filled repeatedly with fresh air before the engine comes to a standstill. For the subsequent direct start, however, it is sufficient to activate first compressor 5 only for the last opening of intake valve 20 to create the filling of the at least one cylinder 15 which is necessary for the subsequent direct start. This makes it possible to minimize energy consumption for activation of first compressor 5. First compressor 5 is activated when engine controller 80 detects the crank angle at which intake valve 20 is opened for the last revolution of the crankshaft (derived from the engine speed) before the engine comes to a standstill, at which last revolution intake valve 20 of the at least one cylinder 15 is opened for the last time. First compressor 5 may also be activated shortly before opening intake valve 20 so that first compressor 5 is already ramped up to its desired compressor output on opening intake valve 20.

It is also advantageous if first compressor 5 remains activated at least until the last closing of intake valve 20 and exhaust valve 25 of the at least one cylinder 15 before the engine comes to a standstill. This ensures that the filling of the at least one cylinder 15, which is accomplished by the compressor output of first compressor 5, will also remain in the at least one cylinder 15, so the subsequent direct start is ensured.

For the case when combustion engine 10 is operated with a chronological overlap of the opening of intake valve 20 and that of exhaust valve 25, it is also possible in an advantageous manner for first compressor 5 to be activated as a function of the crank angle of internal combustion engine 1, so that fresh air may be added to the at least one cylinder 15 at least during a last overlap of the opening of intake valve 20 and that of exhaust valve 25 of the at least one cylinder 15 before the engine comes to a standstill. This makes it possible to ensure that backflow of residual gas out of exhaust line 35 into combustion chamber 30 is essentially prevented by the pressure built up by first compressor 5 on the side of air supply 45, referred to as the intake side, of combustion engine 10. First compressor 5 may already be activated before the last overlap of the opening of intake valve 20 and exhaust valve 25 of the at least one cylinder 15 to reliably prevent a backflow of residual gas.

For the case when the compressor output of first compressor 5 is variable and preselectable by engine controller 80, the filling of the at least one cylinder 15 and the prevention of backflow of residual gas may also be influenced quantitatively. The compressor output of first compressor 5 may be influenced by varying the rotational speed of the compressor, for example. In this example, engine controller 80 may trigger the electric motor of first compressor 5, so that a desired rotational speed of first compressor 5 is established to achieve a desired compression ratio via first compressor 5. Then a first engine characteristics map may be stored in engine controller 80, specifying, as a function of a maximum filling of the at least one cylinder 15 which is to be set, a rotational speed of first compressor 5 at which this maximum filling may be implemented in the at least one cylinder 15 when combustion engine 10 is coasting. The first engine characteristics map may be applied on a test stand, for example. It may be sufficient if a compromise is made between the minimum possible rotational speed of first compressor 5 and the maximum possible filling of the at least one cylinder 15 sufficient for the subsequent direct start to minimize energy consumption of first compressor 5. In this way, first compressor 5 may be triggered by engine controller 80, so that combustion chamber 30 of the at least one cylinder 15 is filled maximally or at least adequately with fresh air after the last closing of intake valve 20 and exhaust valve 25 and before the engine comes to a standstill.

In addition, a second engine characteristics map may be stored in engine controller 80, whereby as a function of a minimum residual gas quantity to be set in combustion chamber 30 of the at least one cylinder 15, a rotational speed of first compressor 5 at which this minimum residual gas quantity is implementable in the at least one cylinder 15 when combustion engine 10 is coasting is preselected. The minimum residual gas quantity may be selected so that it results in a negligible backflow of residual gas into combustion chamber 30. The second engine characteristics map may also be applied on a test stand, for example. Again, it may be sufficient if a compromise is made between the lowest possible rotational speed of first compressor 5 and the lowest possible residual gas quantity in combustion chamber 30 of the at least one cylinder 15 which is still sufficient for the subsequent direct start to minimize energy consumption by first compressor 5. In this way, first compressor 5 may be triggered by engine controller 80 so that a backflow of residual gas out of exhaust line 35 of internal combustion engine 1 into combustion chamber 30 of the at least one cylinder 15 is largely prevented.

Removal of the residual gas is important to provide enough air filling for the first and second combustion in a direct start. Only the quantity of air enclosed in combustion chamber 30 of the at least one cylinder 15 after the last closing of intake valve 20 and exhaust valve 25 is available for the first and second combustion of the direct start and thus essentially determines the torque generated and ultimately also the quality of the start.

Figure 2:
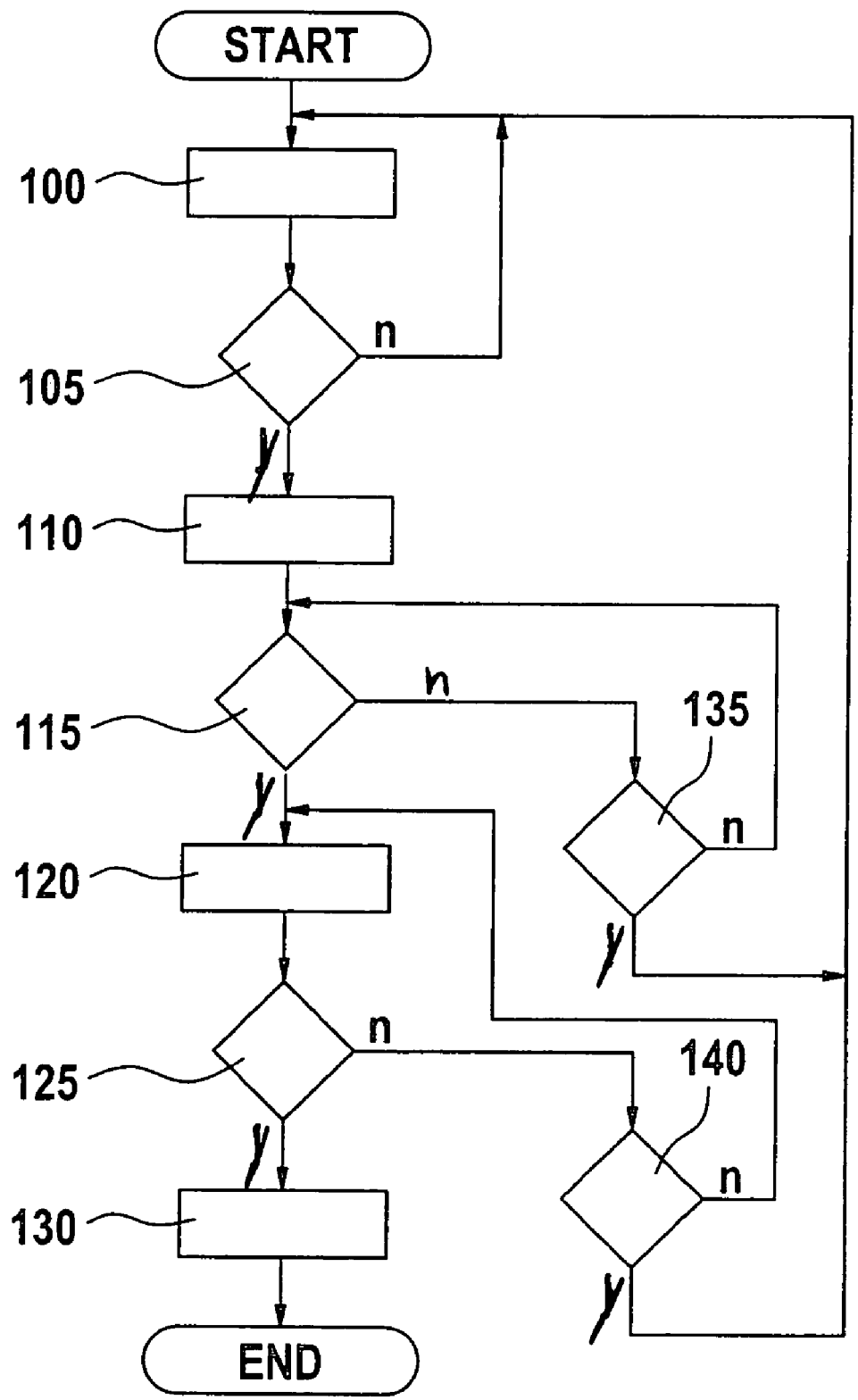
FIG. 2 shows a flow chart for an exemplary sequence of the method according to the present invention.

FIG. 2 shows a flow chart for an exemplary sequence of the method according to the present invention. After the start of the program, the engine speed is derived from the signal of crank angle sensor 75 by engine controller 80 at a program point 100 in the manner described here. Then the program branches off to a program point 105.

At program point 105, engine controller 80 checks on whether the engine speed thus determined is below the preselected threshold. If this is the case, then the program branches off to a program point 110; otherwise it branches back to program point 100.

At program point 110, engine controller 80 determines from the engine speed and its gradient over time the number of remaining revolutions of the crankshaft until the engine comes to a standstill. From the course of the crank angle itself, engine controller 80 determines the at least one cylinder 15 which will come to a standstill in the preferred position described above for a subsequent direct start and it determines the crank angle at which or shortly after which the at least one cylinder 15 will have opened its intake valve 20 for the last time before the engine comes to a standstill and, if necessary, will have at the same time opened its exhaust valve 25. Then the program branches off to a program point 115.

At program point 115, engine controller 80 determines on the basis of the signal of crank angle sensor 75 and the revolution of crankshaft 70 derived therefrom whether the crank angle, determined at program point 110, at which or shortly after which the at least one first cylinder 15 will have opened its intake valve 20 and, if necessary, at the same time its exhaust valve 25 for the last time before the engine comes to a standstill, exists. If this is the case, the system branches off to a program point 120; otherwise it branches off to a program point 135.

At program point 120, engine controller 80 activates first compressor 5 and triggers it so that it is operated at a rotational speed which will result in maximum filling and a minimum residual gas level in combustion chamber 30 of the at least one cylinder 15 according to the first engine characteristics map and the second engine characteristics map. Then the program branches off to a program point 125.

At program point 125, engine controller 80 checks on whether intake valve 20 and exhaust valve 25 have been closed for the last time, and it does so by analyzing the signal of crank angle sensor 75. If this is the case, it branches off to a program point 130; otherwise it branches off to a program point 140.

At program point 130, engine controller 80 deactivates first compressor 5. Then the program is terminated.

At program point 135, engine controller 80 checks on whether the coasting of combustion engine 10 has been interrupted. If this is the case, then the program branches back to program point 100; otherwise it branches back to program point 115. The check on whether the coasting of combustion engine 10 has been interrupted may be performed by having engine controller 80 check on whether the engine speed is increasing further or whether the idling speed or the preselected threshold has been exceeded again. If this is the case, it is then assumed that coasting of combustion engine 10 has been interrupted. Otherwise it is assumed that combustion engine 10 is still coasting.

At program point 140, engine controller 80 checks, in the manner described with regard to program point 135, on whether the coasting of combustion engine 10 has been terminated. If this is the case, the program branches back to program point 100; otherwise it branches back to program point 120.

What is claimed is:

1. A method for operating an internal combustion engine comprising:

compressing, using a compressor, fresh air supplied to a combustion engine of the internal combustion engine; and when the combustion engine is slowing down to a standstill, activating the compressor to fill at least one cylinder, which comes to a standstill in a position suitable for a subsequent direct start.

2. The method according to claim 1, further comprising driving the compressor independently of the internal combustion engine.

3. The method according to claim 1, wherein the compressor includes an electrically operated supercharger.

4. The method according to claim 1, wherein the compressor is activated as a function of an engine speed of the internal combustion engine.

5. The method according to claim 1, wherein the compressor is activated as a function of a crank angle of the internal combustion engine so that fresh air may be supplied to the at least one cylinder at least during a last opening of an intake valve of the least one cylinder before the engine comes to a standstill.

6. The method according to claim 1, wherein the compressor remains activated at least until a last closing of an intake valve and an exhaust valve of the at least one cylinder before the engine comes to a standstill.

7. The method according to claim 1, wherein the compressor is activated as a function of a crank angle of the internal combustion engine so that fresh air may be added to the at least one cylinder at least during a last overlap of an opening of an intake valve and an exhaust valve of the at least one cylinder before the engine comes to a standstill.

8. The method according to claim 1, further comprising triggering the compressor so that a combustion chamber of the at least one cylinder is filled with fresh air to a maximum extent after a last closing of an intake valve and an exhaust valve before the engine comes to a standstill.

9. The method according to claim 1, further comprising triggering the compressor so that a backflow of residual gas from an exhaust line of the internal combustion engine into a combustion chamber of the at least one cylinder is substantially prevented.

* * * * *